United States Patent
Takahashi

(10) Patent No.: US 12,147,543 B2
(45) Date of Patent: Nov. 19, 2024

(54) VULNERABILITY MANAGEMENT SYSTEM AND VULNERABILITY MANAGEMENT METHOD

(71) Applicant: Hitachi, Ltd., Tokyo (JP)

(72) Inventor: Takafumi Takahashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 224 days.

(21) Appl. No.: 17/950,609

(22) Filed: Sep. 22, 2022

(65) Prior Publication Data

US 2023/0185924 A1 Jun. 15, 2023

(30) Foreign Application Priority Data

Dec. 14, 2021 (JP) .................................. 2021-202570

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC . H04L 2209/38; H04L 9/0637; H04L 9/3239; H04L 63/20; H04L 41/22; H04L 63/08; H04L 63/102; H04L 63/1416; H04L 67/1097; H04L 63/1425; H04L 67/306; G06F 16/2379; G06F 16/27; G06F 16/248; G06F 16/951; G06F 3/0482; G06F 16/1834; G06F 16/24575; G06F 16/24578; G06F 7/08; G06F 9/541; G06F 21/577; H04W 4/24; H04W 12/08; H04W 12/06;

(Continued)

(56) References Cited

U.S. PATENT DOCUMENTS

| 1 A * | 7/1836 | Ruggles | .................. B61C 11/04 |
| | | | 295/4 |
| 2 A * | 7/1836 | Goulding | ............... D01G 21/00 |
| | | | 57/58.49 |

(Continued)

FOREIGN PATENT DOCUMENTS

JP 2019056986 A 4/2019

*Primary Examiner* — Sharif E Ullah
(74) *Attorney, Agent, or Firm* — MATTINGLY & MALUR, PC

(57) ABSTRACT

A vulnerability management system calculates an impact factor based on vulnerability information, which indicates a magnitude of an impact of a vulnerability of a container in an application execution system on the application execution system. The vulnerability information is information in which the vulnerability and an evaluation value thereof are associated with each other. An access frequency factor is calculated based on access frequency information, the access frequency factor being an evaluation value of a vulnerability deriving from a form of communication performed by the container. The access frequency information is related to a transmission or reception range and a transmission or reception frequency of data of the container. A weighting determination value is calculated based on the impact factor and the access frequency factor, the weighting determination value indicating a priority of a measure against the vulnerability of the container; and the order of measures is determined.

6 Claims, 19 Drawing Sheets

(58) Field of Classification Search
CPC ........... H04W 4/12; H04W 4/35; H04W 4/50; H04W 88/16
USPC .......... 726/25, 2, 21, 36; 713/150, 163, 181; 380/255, 264, 276
See application file for complete search history.

(56) References Cited

U.S. PATENT DOCUMENTS

| | | | | |
|---|---|---|---|---|
| 201 A * | 5/1837 | Stanton | H04B 1/717 | 62/345 |
| 9,077 A * | 6/1852 | Peck | B01F 23/56 | 366/2 |
| 91,357 A * | 6/1869 | Mayer | F24B 13/008 | 126/245 |
| 202,000 A * | 4/1878 | Curtice | E03F 5/0404 | 210/311 |
| 6,615,349 B1 * | 9/2003 | Hair | G06F 21/6209 | 713/168 |
| 7,926,113 B1 * | 4/2011 | Gula | H04L 63/1425 | 726/25 |
| 8,793,151 B2 * | 7/2014 | DelZoppo | G06Q 10/0635 | 705/7.28 |
| 9,038,163 B2 * | 5/2015 | Larson | H04L 61/3015 | 726/15 |
| 9,077,695 B2 * | 7/2015 | Larson | H04L 63/04 | |
| 9,413,766 B2 * | 8/2016 | Larson | H04L 61/5076 | |
| 9,460,474 B2 * | 10/2016 | Grignon | G06Q 10/06 | |
| 10,002,507 B2 * | 6/2018 | Wilson | G08B 13/19656 | |
| 10,075,334 B1 * | 9/2018 | Kozura | H04W 12/068 | |
| 10,102,510 B2 * | 10/2018 | Yau | G06Q 20/3829 | |
| 10,116,630 B2 * | 10/2018 | Caragea | H04L 63/166 | |
| 10,142,122 B1 * | 11/2018 | Hill | H04L 12/2807 | |
| 10,163,079 B1 * | 12/2018 | Brock | G06Q 20/381 | |
| 10,216,508 B1 * | 2/2019 | Vartha | G06F 8/64 | |
| 10,332,205 B1 * | 6/2019 | Russell | G06Q 40/04 | |
| 10,446,017 B1 * | 10/2019 | Gershoni | G08B 21/043 | |
| 10,606,930 B2 * | 3/2020 | Zak | H04L 67/306 | |
| 12,013,949 B2 * | 6/2024 | Sethi | G06F 21/57 | |
| 2003/0088644 A1 * | 5/2003 | Ganguly | H04L 9/40 | 714/E11.193 |
| 2005/0147102 A1 * | 7/2005 | Tai | H04L 12/2801 | 370/395.2 |
| 2005/0278786 A1 * | 12/2005 | Tippett | H04L 63/1416 | 726/25 |
| 2006/0075503 A1 * | 4/2006 | Bunker | G06F 21/577 | 726/1 |
| 2006/0168270 A1 * | 7/2006 | Townsley | H04L 69/168 | 709/230 |
| 2008/0000015 A1 * | 1/2008 | Sutter | A42B 3/04 | 2/410 |
| 2012/0000032 A1 * | 1/2012 | Van De Veen | A47L 9/0081 | 15/412 |
| 2013/0218721 A1 * | 8/2013 | Borhan | G06Q 30/02 | 705/26.41 |
| 2014/0000222 A1 * | 1/2014 | Villers | B65B 29/00 | 53/449 |
| 2014/0244500 A1 * | 8/2014 | Elias | G06Q 20/1085 | 705/43 |
| 2014/0279489 A1 * | 9/2014 | Russell | H04L 63/105 | 705/42 |
| 2014/0337982 A1 * | 11/2014 | Crosby | H04L 63/1433 | 726/25 |
| 2015/0003637 A1 * | 1/2015 | Chen | H03G 1/02 | 381/122 |
| 2015/0172919 A1 * | 6/2015 | Basnayake | H04L 63/12 | 455/411 |
| 2015/0254640 A1 * | 9/2015 | Cassano | G06Q 20/36 | 705/71 |
| 2015/0262173 A1 * | 9/2015 | Durbin | G06Q 20/381 | 705/64 |
| 2015/0269539 A1 * | 9/2015 | MacGregor | H04L 63/08 | 705/39 |
| 2015/0332256 A1 * | 11/2015 | Minor | H04L 9/50 | 705/69 |
| 2015/0363778 A1 * | 12/2015 | Ronca | G06Q 20/4016 | 705/71 |
| 2015/0363783 A1 * | 12/2015 | Ronca | G06Q 20/382 | 705/71 |
| 2015/0365283 A1 * | 12/2015 | Ronca | G06Q 20/065 | 705/71 |
| 2016/0147977 A1 * | 5/2016 | Adams | G07F 9/001 | 700/232 |
| 2016/0217280 A1 * | 7/2016 | Oberheide | H04W 12/068 | |
| 2016/0379208 A1 * | 12/2016 | Deliwala | G06Q 20/409 | 705/67 |
| 2017/0000001 A1 * | 1/2017 | Freed | A01B 35/28 | |
| 2017/0053249 A1 * | 2/2017 | Tunnell | G09C 5/00 | |
| 2017/0083907 A1 * | 3/2017 | McDonough | G06Q 20/3825 | |
| 2017/0140174 A1 * | 5/2017 | Lacey | G06Q 20/4016 | |
| 2017/0221066 A1 * | 8/2017 | Ledford | G06Q 20/4016 | |
| 2017/0255937 A1 * | 9/2017 | Maddukuri | G06Q 20/3674 | |
| 2017/0346851 A1 * | 11/2017 | Drake | H04L 9/0838 | |
| 2018/0025442 A1 * | 1/2018 | Isaacson | H04L 51/48 | 705/26.62 |
| 2018/0124047 A1 * | 5/2018 | Fisher | H04L 63/0861 | |
| 2018/0341934 A1 * | 11/2018 | Rodrigues | G07F 19/209 | |
| 2019/0023659 A1 * | 1/2019 | Pazenok | C07D 221/10 | |
| 2019/0026705 A1 * | 1/2019 | Lee | G06Q 20/065 | |
| 2019/0043022 A1 * | 2/2019 | Fosmark | G06Q 20/322 | |
| 2019/0147440 A1 * | 5/2019 | Deliwala | G06Q 20/3821 | 705/71 |
| 2019/0149627 A1 * | 5/2019 | Zhuang | H04L 67/306 | 709/224 |
| 2019/0236571 A1 * | 8/2019 | Arora | G06Q 20/065 | |
| 2019/0236598 A1 * | 8/2019 | Padmanabhan | G06Q 20/389 | |
| 2019/0238584 A1 * | 8/2019 | Somasundaram | H04L 63/20 | |
| 2019/0318326 A1 * | 10/2019 | Russell | G06Q 20/3276 | |
| 2019/0319987 A1 * | 10/2019 | Levy | G06F 16/93 | |
| 2019/0349770 A1 * | 11/2019 | Andres | H04L 63/10 | |
| 2019/0354963 A1 * | 11/2019 | Di Iorio | G06Q 20/3678 | |
| 2020/0005295 A1 * | 1/2020 | Murphy | G06Q 20/405 | |
| 2020/0019762 A1 * | 1/2020 | Xu | G06V 40/173 | |
| 2020/0143364 A1 * | 5/2020 | Walters | G06Q 20/16 | |
| 2020/0258152 A1 * | 8/2020 | Naggar | H04L 9/50 | |
| 2020/0342424 A1 * | 10/2020 | Friedlander | G06Q 20/381 | |
| 2020/0342507 A1 * | 10/2020 | Hubbard | A24F 40/53 | |
| 2020/0389480 A1 * | 12/2020 | Nunes | H04L 67/02 | |
| 2022/0021697 A1 * | 1/2022 | Adamson | H04L 63/20 | |
| 2022/0407891 A1 * | 12/2022 | Albanese | H04L 63/205 | |
| 2023/0185924 A1 * | 6/2023 | Takahashi | G06F 21/53 | 726/25 |
| 2024/0054725 A1 * | 2/2024 | Chen | G06Q 10/047 | |

* cited by examiner

VULNERABILITY INFORMATION MANAGEMENT DB 100

| VULNERABILITY | CVSS SCORE | HOST CATEGORY-BY-HOST CATEGORY IMPACT DEGREE | HANDLING METHOD |
|---|---|---|---|
| A | 6.3 | OPEN SERVER: HIGH<br>INTERNAL SERVER: LOW<br>.<br>.<br>. | LIBRARY UPDATE |
| B | 4.8 | | |
| C | 3.2 | | |
| D | 2.0 | | |

TRAFFIC MANAGEMENT DB ~120

| APPLICATION (121) | | INBOUND COMMUNICATION (122) | | | | OUTBOUND COMMUNICATION (123) | | | |
|---|---|---|---|---|---|---|---|---|---|
| | | OUT-OF-COMPANY (1221) | IN-COMPANY (1222) | IN-CLUSTER (OUT-OF-APPLICATION) (1223) | LOCAL (IN-APPLICATION) (1224) | OUT-OF-COMPANY (1231) | IN-COMPANY (1232) | IN-CLUSTER (OUT-OF-APPLICATION) (1233) | LOCAL (IN-APPLICATION) (1234) |
| APPLICATION A | CONTAINER IMAGE A | | | | ○ | | | | ○ |
| | CONTAINER IMAGE X | ○ | | | | | | ○ | ○ |
| | CONTAINER IMAGE Y | | ○ | | ○ | | | | ○ |
| APPLICATION B | CONTAINER IMAGE B | | | | ○ | | | | ○ |
| | CONTAINER IMAGE X | | ○ | | ○ | | | | ○ |
| | CONTAINER IMAGE Y | | | ○ | ○ | | | | ○ |
| | CONTAINER IMAGE Z | | | | ○ | ○ | | | |
| APPLICATION C | CONTAINER IMAGE C | | ○ | | ○ | | | ○ | ○ |
| | CONTAINER IMAGE Y | | | ○ | ○ | | | | ○ |
| | CONTAINER IMAGE Z | | | | ○ | ○ | | | ○ |

CATEGORY-BY-CATEGORY
RISK IMPACT FACTOR DB — 110

| # | RISK IMPACT DEGREE | FACTOR |
|---|---|---|
| 1 | SEVERE | 2 |
| 2 | HIGH | 1.5 |
| 3 | INTERMEDIATE | 1 |
| 4 | LOW | 0.5 |

FIG. 9

IMPACT FACTOR DB

| APPLICATION | | VULNERABILITY | | | | |
| --- | --- | --- | --- | --- | --- | --- |
| | | TOTAL | A | B | C | D |
| APPLICATION A | | 10.45 | 9.45 | 1 | 0 | 0 |
| | CONTAINER IMAGE A | 0 | 0 | 0 | 0 | 0 |
| | CONTAINER IMAGE X | 1 | 0 | 1 | 0 | 0 |
| | CONTAINER IMAGE Y | 9.45 | 9.45 | 0 | 0 | 0 |
| APPLICATION B | | 10.95 | 3.15 | 4.8 | 0 | 3 |
| | CONTAINER IMAGE B | 3 | 0 | 0 | 0 | 3 |
| | CONTAINER IMAGE X | 4.8 | 0 | 4.8 | 0 | 0 |
| | CONTAINER IMAGE Y | 3.15 | 3.15 | 0 | 0 | 0 |
| | CONTAINER IMAGE Z | 0 | 0 | 0 | 0 | 0 |
| APPLICATION C | | 6.3 | 6.3 | 0 | 0 | 0 |
| | CONTAINER IMAGE C | 0 | 0 | 0 | 0 | 0 |
| | CONTAINER IMAGE Y | 6.3 | 6.3 | 0 | 0 | 0 |
| | CONTAINER IMAGE Z | 0 | 0 | 0 | 0 | 0 |

ACCESS FREQUENCY MANAGEMENT DB — 140

141 — APPLICATION / CONTAINER IMAGE
142 — INBOUND COMMUNICATION
143 — OUTBOUND COMMUNICATION

| APPLICATION | | OUT-OF-COMPANY | IN-COMPANY | IN-CLUSTER (OUT-OF-APPLICATION) | LOCAL (IN-APPLICATION) | OUT-OF-COMPANY | IN-COMPANY | IN-CLUSTER (OUT-OF-APPLICATION) | LOCAL (IN-APPLICATION) |
|---|---|---|---|---|---|---|---|---|---|
| APPLICATION A | CONTAINER IMAGE A | | | | 12000 | 9000 | | | 12000 |
| | CONTAINER IMAGE X | | 300 | | 14000 | | | 8000 | 14000 |
| | CONTAINER IMAGE Y | 1200 | | | 13000 | | | | 13000 |
| APPLICATION B | CONTAINER IMAGE B | | | | 10000 | | | | 10000 |
| | CONTAINER IMAGE X | | 3000 | | 12000 | | | | 12000 |
| | CONTAINER IMAGE Y | | | | 11000 | | | | 11000 |
| | CONTAINER IMAGE Z | | | 15000 | 13000 | 1000 | | | 13000 |
| APPLICATION C | CONTAINER IMAGE C | | 1500 | | 10000 | | | 15000 | 10000 |
| | CONTAINER IMAGE Y | | | 8000 | 11000 | | | | 11000 |
| | CONTAINER IMAGE Z | | | | 12000 | 5000 | | | 12000 |

FIG. 12

ACCESS FREQUENCY FACTOR MANAGEMENT DB — 160

| APPLICATION 161 | | INBOUND COMMUNICATION 162 | | | | OUTBOUND COMMUNICATION 163 | | | |
|---|---|---|---|---|---|---|---|---|---|
| | | OUT-OF-COMPANY | IN-COMPANY | IN-CLUSTER (OUT-OF-APPLICATION) | LOCAL (IN-APPLICATION) | OUT-OF-COMPANY | IN-COMPANY | IN-CLUSTER (OUT-OF-APPLICATION) | LOCAL (IN-APPLICATION) |
| APPLICATION A | CONTAINER IMAGE A | | | | 15 | 2 | | | 25 |
| | CONTAINER IMAGE X | | | | 12 | | | 11 | 22 |
| | CONTAINER IMAGE Y | 1 | 5 | | 13 | | | | 23 |
| APPLICATION B | CONTAINER IMAGE B | | | | 20 | | | | 30 |
| | CONTAINER IMAGE X | | 6 | | 15 | | | | 25 |
| | CONTAINER IMAGE Y | | | | 18 | | | | 28 |
| | CONTAINER IMAGE Z | | | 8 | 13 | 4 | | | 23 |
| APPLICATION C | CONTAINER IMAGE C | | 7 | | 21 | | | 10 | 30 |
| | CONTAINER IMAGE Y | | | 9 | 18 | | | | 28 |
| | CONTAINER IMAGE Z | | | | 15 | 3 | | | 25 |

SEVERITY MANAGEMENT DB 171　　　172　　　　　170

| SEVERITY | SCORE |
|---|---|
| URGENT | 9.0~ |
| SERIOUS | 7.0~8.9 |
| ALERT | 4.0~6.9 |
| CAUTION | 0.1~3.9 |
| NONE | 0 |

FIG. 13

WEIGHTING DETERMINATION DB 150

| APPLICATION | | WEIGHTING DETERMINATION VALUE | CATEGORY |
|---|---|---|---|
| APPLICATION A | | | |
| | CONTAINER IMAGE A | — | |
| | CONTAINER IMAGE X | 5 | CAUTION |
| | CONTAINER IMAGE Y | 1 | URGENT |
| APPLICATION B | | | |
| | CONTAINER IMAGE B | 6 | CAUTION |
| | CONTAINER IMAGE X | 3 | ALERT |
| | CONTAINER IMAGE Y | 4 | CAUTION |
| | CONTAINER IMAGE Z | — | |
| APPLICATION C | | | |
| | CONTAINER IMAGE C | — | |
| | CONTAINER IMAGE Y | 2 | ALERT |
| | CONTAINER IMAGE Z | — | |

ACCESS RECORDING DB 200

| # | PROCESS | ACCESS NUMBER | | | | |
|---|---|---|---|---|---|---|
| | | $\Delta_1$ | $\Delta_2$ | $\Delta_3$ | $\Delta_4$ | $\Delta_5$ |
| 1 | A | 40 | 50 | 30 | 20 | 10 |
| 2 | B | 80 | 100 | 90 | 90 | 70 |
| 3 | C | 30 | 0 | 30 | 40 | 70 |
| 4 | X | 70 | 90 | 50 | 50 | 20 |
| 5 | Y | 70 | 0 | 40 | 10 | 100 |
| 6 | Z | 10 | 60 | 60 | 90 | 30 |

PRIORITY RECORDING DB 211   212   213          210

| # | PROCESS | PRIORITY FACTOR |
|---|---------|-----------------|
| 1 | A | 70 |
| 2 | B | 50 |
| 3 | C | 30 |
| 4 | X | 20→40 |
| 5 | Y | 40→20 |
| 6 | Z | 10 |

FIG. 17

```
apiVersion: apps/v1beta1
kind: Deployment
metadata:
  name: sample-deployment
  labels:
    app: sample
spec:
  # NUMBER OF REPLICAS
  replicas: 1
  .
  .
  .
```

FIG. 19

VULNERABILITY MANAGEMENT SYSTEM AND VULNERABILITY MANAGEMENT METHOD

CROSS-REFERENCE TO RELATED APPLICATION

This application claims priority pursuant to Japanese patent application No. 2021-202570, filed on Dec. 14, 2021, the entire disclosure of which is incorporated herein by reference.

BACKGROUND

Technical Field

The present invention relates to a vulnerability management system and a vulnerability management method.

Related Art

An application execution platform (for example, Kubernetes) using a container technology is widely used and, in the application execution platform, multiple applications operate in cooperation with one another. Moreover, in recent years, due to increasing interest in security measures, there is an attempt to incorporate existing continuous integration/continuous delivery (CI/CD) in the application execution platform to perform such an operation that security update of containers is performed with services stably running (so-called DevSecOps).

As a technique relating to update of containers, for example, Japanese Patent Application Publication No. 2019-56986 discloses the following configuration. A batch job analysis part of a verification apparatus analyzes a batch job assigned to a production server before execution of the batch job to identify a container image to be used, a container image information collection part refers to a container image registry to collect version information of the container image, a container image verification management part executes the batch job in a verification server when a new version of the container image to be used by the batch job is released, and a monitor verification part performs at least one of monitoring of performance information during execution of the batch job executed in the verification server and verification of the execution result.

However, in such an application execution platform, there is a case where vulnerabilities are found in multiple containers and security update needs to performed for these containers but the application execution platform has no free resources. In such a case, a security administrator needs to adjust a schedule of the update for the containers and there is a latency before start of the update for each container. Thus, there is a risk of occurrence a security incident due to delay in measures against the vulnerabilities.

SUMMARY

The present invention has been made in view of such backgrounds and an object thereof is to provide a vulnerability management system and a vulnerability management method that can efficiently resolve vulnerabilities when the vulnerabilities are present in multiple containers of an application execution system.

An aspect of the present invention to solve the above object is a vulnerability management system including a processor and a memory, comprising: an impact factor calculation part configured to calculate an impact factor based on vulnerability information, the impact factor being a parameter indicating a magnitude of an impact of a vulnerability of a container in an application execution system, in which an application is executed by one or a plurality of containers, on the application execution system, the vulnerability information being information in which the vulnerability and an evaluation value of the vulnerability are associated with each other; an access frequency factor calculation part configured to calculate an access frequency factor based on access frequency information, the access frequency factor being an evaluation value of a vulnerability deriving from a form of communication performed by the container, the access frequency information being information related to a transmission or reception range and a transmission or reception frequency of data transmitted or received by the container; a weighting determination value calculation part configured to calculate a weighting determination value based on the calculated impact factor and the calculated access frequency factor, the weighting determination value indicating a priority of a measure against the vulnerability of the container; and a scheduling processing part configured to determine the order of measures, respectively, for a plurality of the containers based on the weighting determination values calculated for the plurality of containers and execute the measures, respectively, for the plurality of containers according to the determined order.

Another aspect of the present invention to solve the above object is a vulnerability management method implemented by an information processing apparatus to execute processing comprising: impact factor calculation processing of calculating an impact factor based on vulnerability information, the impact factor being a parameter indicating a magnitude of an impact of a vulnerability of a container in an application execution system, in which an application is executed by one or a plurality of containers, on the application execution system, the vulnerability information being information in which the vulnerability and an evaluation value of the vulnerability are associated with each other; access frequency factor calculation processing of calculating an access frequency factor based on access frequency information, the access frequency factor being an evaluation value of a vulnerability deriving from a form of communication performed by the container, the access frequency information being information related to a transmission or reception range and a transmission or reception frequency of data transmitted or received by the container; weighting determination value calculation processing of calculating a weighting determination value based on the calculated impact factor and the calculated access frequency factor, the weighting determination value indicating a priority of a measure against the vulnerability of the container; and a scheduling processing of determining the order of measures, respectively, for a plurality of the containers based on the weighting determination values calculated for the plurality of containers and executing the measures, respectively, for the plurality of containers according to the determined order.

The present invention can efficiently resolve vulnerabilities when the vulnerabilities are present in multiple containers of an application execution system.

Problems, configurations, and effects other than those described above will be made apparent by the description of the following embodiment.

BRIEF DESCRIPTION OF THE DRAWINGS

FIG. 7 is a diagram illustrating an example of a vulnerability information management DB.

FIG. 8 is a diagram illustrating an example of a traffic management DB.

FIG. 9 is a diagram illustrating an example of a category-by-category risk impact factor DB.

FIG. 10 is a diagram illustrating an example of an impact factor DB.

FIG. 11 is a diagram illustrating an example of an access frequency management DB.

FIG. 12 is a diagram illustrating an example of an access frequency factor management DB.

FIG. 13 is a diagram illustrating an example of a severity management DB.

FIG. 14 is a diagram illustrating an example of a weighting determination DB.

FIG. 16 is a diagram illustrating an example of an access recording DB.

FIG. 17 is a diagram illustrating an example of a priority recording DB.

FIG. 19 illustrates an example of an API command for executing degeneration.

DETAILED DESCRIPTION OF EMBODIMENTS

One embodiment of the present invention is described below.

Figure 1:
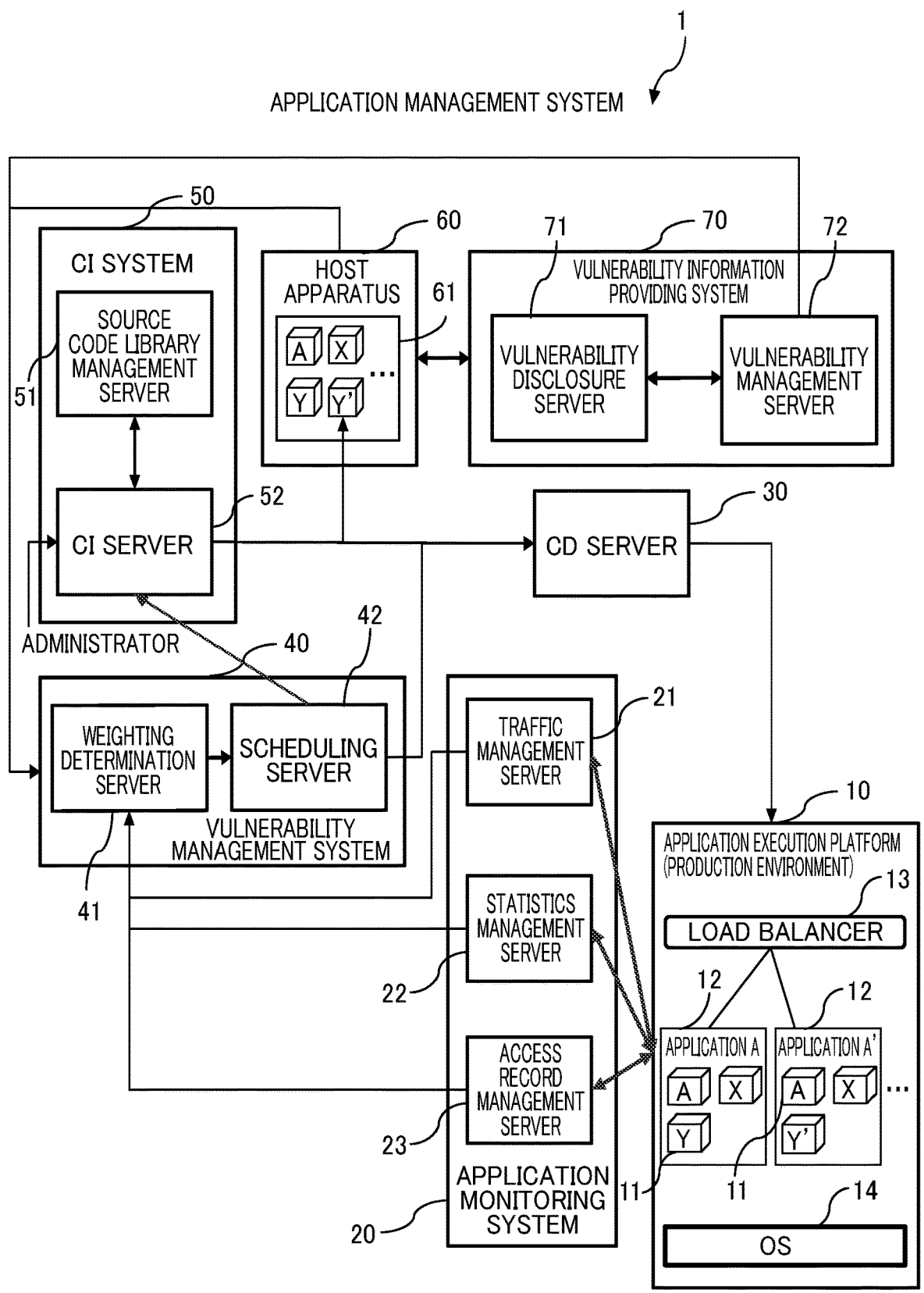
FIG. 1 is a diagram illustrating an example of a configuration of an application management system according to an embodiment.

FIG. 1 is a diagram illustrating an example of a configuration of an application management system 1 according to the present embodiment. The application management system 1 is configured to include information processing apparatuses of an application execution platform 10, an application monitoring system 20, a CD server 30, a vulnerability management system 40, a CI system 50, a host apparatus 60, and a vulnerability information providing system 70.

The application execution platform 10 is an application execution system in which various applications are executed by a container technology. Specifically, the application execution platform 10 includes programs including one or multiple applications 12 that are each formed of one or multiple containers 11 and a load balancer 13 that is used to distribute loads of the respective applications 12. Moreover, the application execution platform 10 stores an operating system (OS) 14 for executing these applications (programs). The application execution platform 10 is, for example, Kubernetes. Note that the container herein refers in general to data in which an execution environment of an application (program) is stored.

The application monitoring system 20 monitors the states of the applications 12 and the containers 11 in the application execution platform 10. The application monitoring system 20 includes a traffic management server 21, a statistics management server 22, and an access record management server 23.

The traffic management server 21 monitors contents of communications (exchange of data) performed by the applications 12 and the containers 11, for example, communications performed in the applications 12 and between the applications 12 and communications performed with application execution systems other than the application execution platform 10, and accumulates information (hereinafter, referred to as traffic information) on histories of these communications. The statistics management server 22 performs various types of statistical processing in the application monitoring system 20. The access record management server 23 accumulates a history on a total number of accesses of each container (hereinafter, simply referred to as container access number) in a predetermined period, repeatedly at a predetermined timing (for example, predetermined time or predetermined time interval).

The CD server 30 (CD: continuous delivery) deploys the containers 11 (applications 12) to the application execution platform 10 based on resources created by the CI system 50.

The vulnerability management system 40 performs management against vulnerability of the applications 12 (containers 11). The vulnerability management system 40 includes a weighting determination server 41 and a scheduling server 42. The weighting determination server 41 calculates weighting determination values that are parameters used to determine priority ranks of measures against vulnerabilities found in the applications 12 (containers 11). The scheduling server 42 performs vulnerability resolving measure processing on the containers 11 according to the weighting determination values. Details of the vulnerability management system 40 are described later.

The CI system 50 (CI: continuous integration) is an information processing system that creates resources forming the applications 12 and that can monitor the vulnerability of each of containers 11 in the host apparatus 60. The CI system 50 includes a source code library management server 51 and a CI server 52. The source code library management server 51 stores the resources (source codes, libraries, and the like) of the containers. The CI server 52 monitors presence or absence of the vulnerability of each container in the host apparatus 60. Moreover, the CI server 52 obtains the resources from the source code library management server 51 and creates (builds) images of the containers based on the obtained resources. Note that the building of the containers by the CI system 50 may be performed automatically or performed based on an operation on the CI system 50 by an administrator.

The host apparatus 60 is an apparatus used by a user using the applications 12 in the application execution platform 10. The host apparatus 60 stores a container 61 of the applications provided by the application execution platform 10. Multiple host apparatuses 60 may be present.

The vulnerability information providing system 70 accumulates and manages various pieces of vulnerability information on the containers. The vulnerability information providing system 70 includes a vulnerability disclosure server 71 and a vulnerability management server 72. The vulnerability disclosure server 71 stores information (hereinafter, referred to as vulnerability disclosure information) on the vulnerabilities of the containers. Moreover, the vulnerability management server 72 can transmit the vulnerability disclosure information to the vulnerability management system 40. Note that the vulnerability disclosure server 71 may be a server that provides the vulnerability disclosure information to an information processing system outside the application management system 1.

The aforementioned information processing apparatuses in the application management system 1 can communicate with one another via a wired or wireless communication network such as, for example, the Internet, local area network (LAN), wide area network (WAN), or an exclusive line.

Next, details of the vulnerability management system 40 are described.

<Weighting Determination Server>

Figure 2:
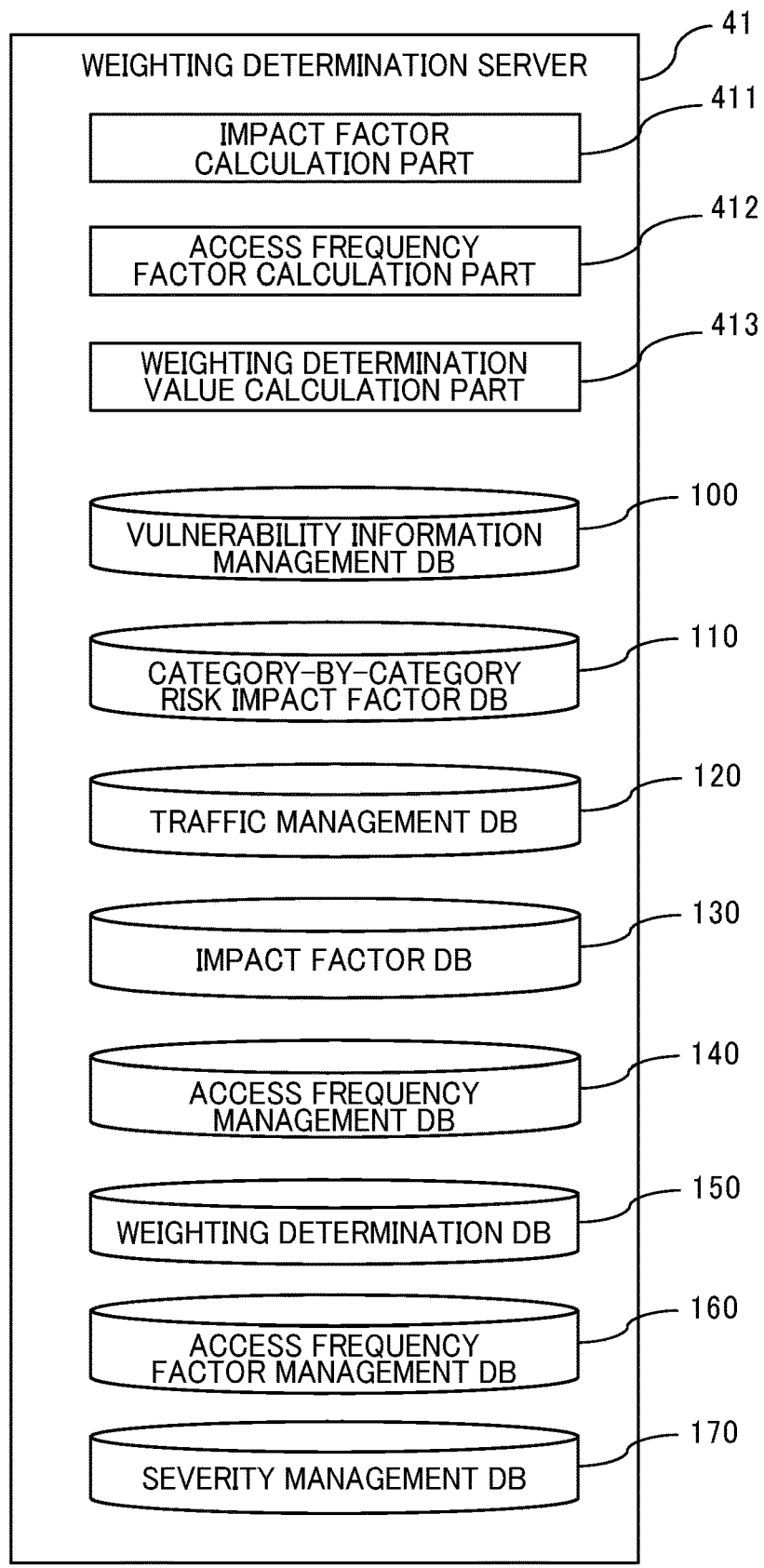
FIG. 2 is a diagram for explaining an example of functions included in a weighting determination server.

FIG. 2 is a diagram for explaining an example of functions included in the weighting determination server 41. The weighting determination server 41 includes an impact factor calculation part 411, an access frequency factor calculation part 412, and a weighting determination value calculation part 413.

The impact factor calculation part 411 calculates an impact factor based on vulnerability information (vulnerability information management DB 100 to be described later), impact factor being a parameter indicating a magnitude of an impact of the vulnerability of each container 11 in the application execution platform 10, in which applications are executed by one or multiple containers, on the application execution platform 10, the vulnerability information being information in which the vulnerability and a predetermined evaluation value of the vulnerability are associated with each other. The impact factor is recorded in an impact factor DB 130 to be described later.

The access frequency factor calculation part 412 calculates an access frequency factor based on access frequency information (recorded in an access frequency management DB 140 to be described later), the access frequency factor being an evaluation value of a vulnerability deriving from a form of communication performed by each container 11, the access frequency information being information related to either a transmission or reception range and a transmission or reception frequency of data transmitted or received by the container 11. The access frequency factor is recorded in an access frequency factor management DB 160 to be described later. Note that the access frequency information is created by using the traffic information of the traffic management server 21. The traffic information is recorded in a traffic management DB 120 to be described later.

The weighting determination value calculation part 413 calculates the weighting determination values indicating the priorities of measures against the vulnerabilities of the containers 11, based on the impact factors and the access frequency factors. The weighting determination values are recorded in a weighting determination DB 150 to be described later.

Moreover, the weighting determination server 41 stores databases of a category-by-category risk impact factor DB 110 and a severity management DB 170.

The category-by-category risk impact factor DB 110 stores weight parameters (hereinafter, referred to as category-by-category risk impact factors) used to calculate the impact factors. The severity management DB 170 stores information (hereinafter, referred to as severity) obtained by categorizing the impact factors. Details of the category-by-category risk impact factor DB 110 and the severity management DB 170 are described later.

<Scheduling Server>

Figure 3:
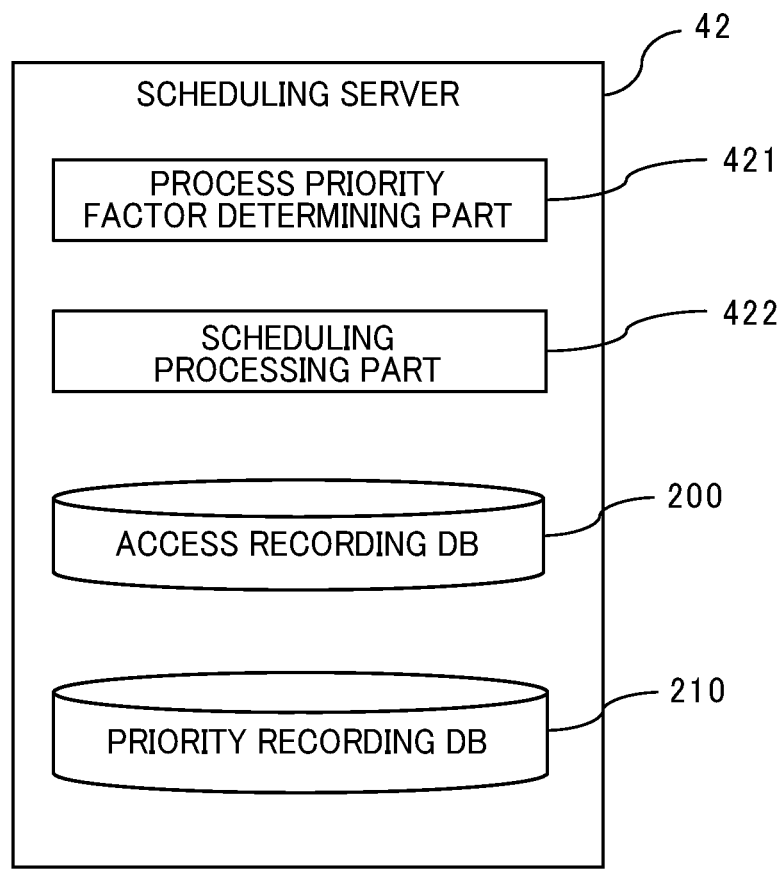
FIG. 3 is a diagram for explaining an example of functions included in a scheduling server.

FIG. 3 is a diagram for explaining an example of functions included in the scheduling server 42. The scheduling server 42 includes a process priority factor determining part 421 and a scheduling processing part 422.

The process priority factor determining part 421 determines a process priority that is information on a priority rank of a process performed by each container 11 in the application execution platform 10, based on the container access number in the access record management server 23.

The scheduling processing part 422 determines the order of measures for the respective multiple containers 11 based on the weighting determination values calculated for the multiple containers 11 and executes the measures for the respective multiple containers 11 according to the determined order.

Moreover, the scheduling server 42 stores databases of an access recording DB 200 and a priority recording DB 210.

The access recording DB 200 stores histories of accesses of the respective processes by the containers 11 in each application 12 of the application execution platform 10. Moreover, the priority recording DB 210 stores the priorities of the processes executed by the containers 11 in each application 12. Details of the access recording DB 200 and the priority recording DB 210 are described later.

Figure 4:
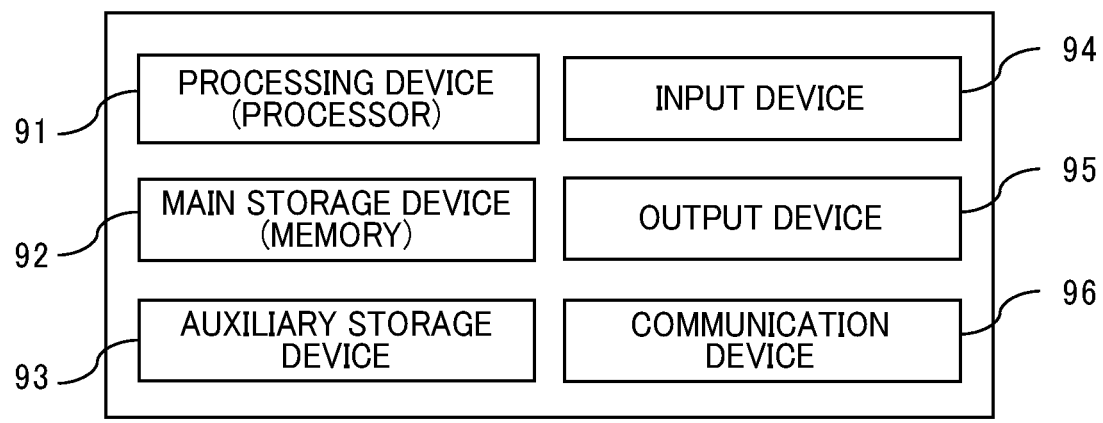
FIG. 4 is a diagram illustrating an example of hardware included in each of information processing apparatuses of the application management system.

FIG. 4 is a diagram illustrating an example of hardware included in each of the information processing apparatuses of the application management system 1. Each information processing apparatus includes a processing device 91 (processor) such as a central processing unit (CPU), a digital signal processor (DSP), a graphics processing unit (GPU), or a field-programmable gate array (FPGA), a main storage device 92 (memory) such as a read only memory (ROM) or a random access memory (RAM), an auxiliary storage device 93 such as a hard disk drive (HDD) or a solid state drive (SSD), an input device 94 formed of a mouse, a keyboard, and the like, an output device 95 formed of a liquid crystal display or an organic electro-luminescence (EL) display, and a communication device 96 formed of a network interface card (NIC), a wireless communication module, a Universal Serial Interface (USB) module, a serial communication module, or the like.

The processing device 91 reads and executes a program stored in the main storage device 92 or the auxiliary storage device 93 to implement functions of each information processing apparatus. Moreover, this program may be, for example, recorded in a recording medium and distributed. Note that each information processing apparatus may be, for example, an apparatus that is entirely or partially implemented by using virtual information processing resources provided by using virtualization techniques, process space isolation techniques, and the like such as a virtual server provided by a cloud system. Moreover, all or some of the functions provided by each information processing apparatus may be implemented by, for example, a service provided by a cloud system via an application programming interface (API) or the like.

Next, an outline of processing performed by the application management system 1 is described.

Figure 5:
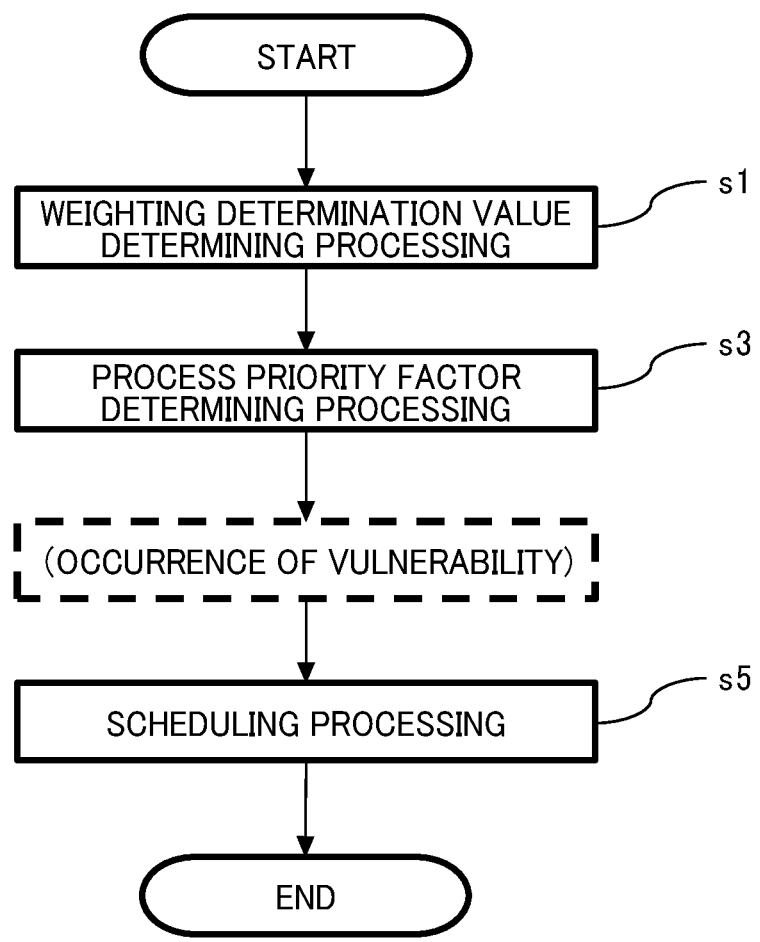
FIG. 5 is a flowchart for explaining an outline of processing performed by the application management system.

FIG. 5 is a flowchart for explaining the outline of the processing performed by the application management system 1.

First, the vulnerability management system 40 executes weighting determination value determining processing s1 in which the weighting determination value related to the vulnerability of each container 11 (application 12) is determined, as needed. Moreover, the vulnerability management system 40 executes process priority factor determining processing s3 in which a process priority factor of the process of each container 11 is determined, as needed.

When a vulnerability is found in one or multiple containers 11, the vulnerability management system 40 executes scheduling processing s5. Specifically, the vulnerability management system 40 determines the order of vulnerability resolving processing by using the weighting determination values determined in the weighting determination value determining processing s1 and performs measures (security update) against the vulnerabilities of the respective containers 11 while increasing free resources based on the weighting determination values and the process priority factors determined in the process priority factor determining processing s3 as necessary.

Note that the processing described above is repeatedly executed.

Next, this processing is described.

<Weighting Determination Value Determining Processing>

Figure 6:
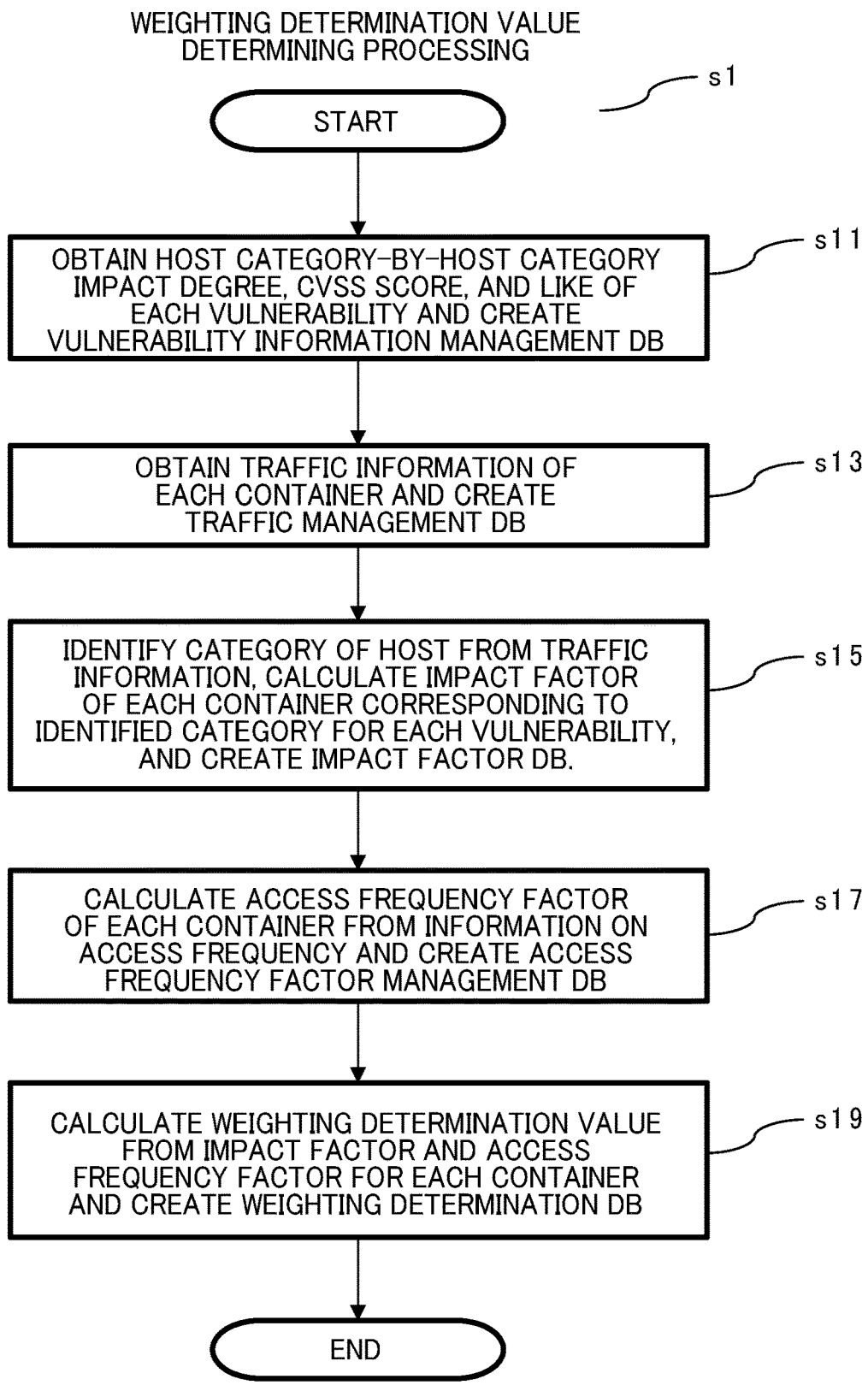
FIG. 6 is a flowchart for explaining an example of weighting determination value determining processing.

FIG. 6 is a flowchart for explaining an example of the weighting determination value determining processing s1. The weighting determination value determining processing s1 is executed at a timing specified by the user or a predetermined timing (for example, predetermined time or predetermined time interval).

First, the weighting determination server 41 creates the vulnerability information management DB 100 (s11).

Specifically, first, the weighting determination server 41 receives the vulnerability disclosure information from the vulnerability management server 72. Then, the weighting determination server 41 stores the received vulnerability disclosure information in the vulnerability information management DB 100.

The vulnerability disclosure information includes, for example, an evaluation value of each vulnerability (in the present embodiment, the evaluation value is assumed to be a common vulnerability scoring system (CVSS) score that is an evaluation value of a vulnerability calculated by a predetermined CVSS), a host category-by-host category impact degree (varying depending on the category of the host apparatus 60 as described later) that is an index of a magnitude of an impact of the vulnerability on the application execution platform 10, and information on a method of handling the vulnerability.

The weighting determination server 41 may display the vulnerability disclosure information received from the vulnerability management server 72 on a predetermined screen and receive an input of data related to the vulnerability information management DB 100 from the user or automatically create the vulnerability information management DB 100 by using a predetermined algorithm based on the received vulnerability disclosure information.

(Vulnerability Information Management DB)

FIG. 7 is a diagram illustrating an example of the vulnerability information management DB 100. The vulnerability information management DB 100 stores the vulnerability information created based on the vulnerability disclosure information. Specifically, the vulnerability information management DB 100 includes data items of vulnerability 101, CVSS score 102, host category-by-host category impact degree 103, and handling method 104.

Information on the types of vulnerabilities is set in the vulnerability 101. Information on the CVSS scores of the vulnerabilities are set in the CVSS score 102. The host category-by-host category impact degrees of the vulnerabilities are set in the host category-by-host category impact degree 103. Information identifying methods of handling the vulnerabilities (methods of update) are set in the handling method 104.

One or multiple host category-by-host category impact degrees are set in the host category-by-host category impact degree 103. Each of the host category-by-host category impact degrees is information indicating a magnitude of an impact of a vulnerability on the application execution platform 10 in levels. Moreover, the host category-by-host category impact degree is set for each of categories of the host apparatus 60. The categories include, for example, a "public server" that exchanges data with a container system other than the application execution platform 10 and an "internal server" that exchanges data only with an application or a container in the application execution platform 10.

Next, as illustrated in FIG. 6, the weighting determination server 41 creates the traffic management DB 120 (s13).

Specifically, the weighting determination server 41 receives a history of communication (traffic information) related to each container 11 in the application execution platform 10 from the access record management server 23 and creates the traffic management DB 120 based on the received traffic information.

(Traffic Management DB 120)

FIG. 8 is a diagram illustrating an example of the traffic management DB 120. The traffic management DB 120 includes data items of application 121, inbound communication 122, and outbound communication 123.

Information identifying each of the containers in each of the applications is set in the application 121.

Various pieces of information are set in the inbound communication 122 when the container indicated by the application 121 performs inbound communication. Specifically, the inbound communication 122 includes data sub-items of out-of-company 1221, in-company 1222, cluster 1223, and local 1224. A symbol of "o" is set in the out-of-company 1221 when the container indicated by the application 121 performs out-of-company communication of receiving data from the outside of the company (container system other than the application execution platform 10) as the inbound communication. A symbol of "o" is set in the in-company 1222 when the container indicated by the application 121 performs in-company communication of receiving data from another application in the company (in the application execution platform 10) as the inbound communication. A symbol of "o" is set in the cluster 1223 when the container indicated by the application 121 performs in-cluster communication of receiving data from another application in the company as the inbound communication. A symbol of "o" is set in the local 1224 when the container indicated by the application 121 performs local communication of receiving data from the same application as the inbound communication.

Various pieces of information are set in the outbound communication 123 when the container indicated by the application 121 performs outbound communication. Specifically, the outbound communication 123 includes data sub-items of out-of-company 1231, in-company 1232, cluster 1233, and local 1234. A symbol of "o" is set in the out-of-company 1231 when the container indicated by the application 121 performs out-of-company communication as the outbound communication. A symbol of "o" is set in the in-company 1232 when the container indicated by the application 121 performs in-company communication as the outbound communication. A symbol of "o" is set in the cluster 1233 when the container indicated by the application 121 performs in-cluster communication as the outbound communication. A symbol of "o" is set in the local 1234 when the container indicated by the application 121 performs local communication as the outbound communication.

Next, as illustrated in FIG. 6, the weighting determination server 41 calculates the impact factor of each container based on the traffic management DB 120 created in s13 and the vulnerability information management DB 100 created in s11 (s15).

Specifically, the weighting determination server 41 identifies the form of communication performed by each container based on the traffic management DB 120 to identify the category of the host apparatus 60. Then, the weighting determination server 41 identifies the host category-by-host category impact degree based on the vulnerability information management DB 100 and the category-by-category risk impact factor DB 110. The weighting determination server 41 calculates the impact factor of each container by referring to the vulnerability information management DB 100 and multiplying the CVSS score of the vulnerability of the container by the category-by-category risk impact factor of this container calculated as described above (s17). The weighting determination server 41 sets information on the calculated impact factor in the impact factor DB 130.

For example, the weighting determination server 41 refers to the traffic management DB 120 and refers to the pieces of data of the out-of-company 1221 of the inbound communication 122 and the out-of-company 1231 of the outbound communication 123 in records related to a certain container and identifies that this container performs the out-of-company communication. Then, the weighting determination server 41 obtains the content of the host category-by-host category impact degree 103 in a record related to a certain vulnerability A in the vulnerability information management DB 100. The weighting determination server 41 thereby identifies that the category of the host apparatus 60 related to this container is the "public server" that performs the out-of-company communication and that the host category-by-host category impact degree for the "public server" is "high". The weighting determination server 41 refers to the category-by-category risk impact factor DB 110 (described in the next section) to identify that the host category-by-host category impact factor corresponding to the host category-by-host category impact degree "high" is "1.5". Then, the weighting determination server 41 obtains a CVSS score "6.3" from the CVSS score 102 of the record in the vulnerability information management DB 100 described above. The weighting determination server 41 multiplies the CVSS score "6.3" by the category-by-category risk impact factor "1.5" to calculate the impact factor related to the vulnerability A of this container.

(Category-by-Category Risk Impact Factor DB)

FIG. 9 is a diagram illustrating an example of the category-by-category risk impact factor DB 110. The category-by-category risk impact factor DB 110 includes data items of number 111, risk impact degree 112, and factor 113. Record numbers are set in the number 111. The host category-by-host category impact degrees are set in the risk impact degree 112. Information on the category-by-category risk impact factors corresponding to the respective host category-by-host category impact degrees is set in the factor 113.

(Impact Factor DB)

FIG. 10 is a diagram illustrating an example of the impact factor DB 130. The impact factor DB 130 includes data items of application 131 and vulnerability 132.

Information identifying each container in each application is set in the application 131. The vulnerability 132 includes data sub-items of total 1321 and category 1322. A total of the impact factors of all vulnerabilities of each container is set in the total 1321. The impact factors related to the respective vulnerabilities of each container are set in the category 1322.

Next, as illustrated in FIG. 6, the weighting determination server 41 creates the access frequency factor management DB 160 (s17).

Specifically, the weighting determination server 41 first receives the history of communication (container access number) related to each container 11 in the application execution platform 10 from the access record management server 23 and creates the access frequency management DB 140 based on the received container access number.

(Access Frequency Management DB)

FIG. 11 is a diagram illustrating an example of the access frequency management DB 140. The access frequency management DB 140 includes data items of application 141, inbound communication 142, and outbound communication 143 and data sub-items for these data items similar to those in the traffic management DB 120. Note that the access frequency information on the inbound communication or the outbound communication is set in each data sub-item of the access frequency management DB 140. For example, an average value of frequency of communication that has occurred in the past seven days is set in each data sub-item.

Then, the weighting determination server 41 refers to the created access frequency management DB 140 to identify the form of communication performed by each container and calculates the access frequency factor of the container based on the identified form of communication and the access frequency information.

For example, the weighting determination server 41 classifies the containers into a category of containers that perform the inbound communication and a category of containers that perform the outbound communication and sets the access frequency factors such that the access frequency factor of the containers that perform the inbound communication is smaller than the access frequency factor of the containers that perform the outbound communication (set the rank of the category of the inbound communication higher than that of the outbound communication). Moreover, the weighting determination server 41 further categorizes the containers in each category into a sub-category of containers that perform the out-of-company communication, a sub-category of containers that perform the in-company communication, a sub-category of containers that perform the in-cluster communication, and a sub-category of containers that perform the local communication and sets the access frequency factors of the respective sub-categories such that the sub-category of the out-of-company communication has the smallest access frequency factor, the in-company communication the second, the in-cluster communication the third, and the local communication the largest (the sub-category of the out-of-company communication has the highest rank, the in-company communication the second, the in-cluster communication the third, and the local communication the lowest). The weighting determination server 41 sets the access frequency factors in each sub-category in such an order that the higher the access frequency is, the smaller the access frequency factor is (the higher the rank is). As described above, the priority ranks are set such that 1. "inbound communication>outbound communication", 2. "out-of-company communication>in-company communication>in-cluster communication>local communication", and 3. in the order of access frequency.

(Access Frequency Factor Management DB)

FIG. 12 is a diagram illustrating an example of the access frequency factor management DB 160. The access frequency factor management DB 160 includes data items of application 161, inbound communication 162, and outbound communication 163 and data sub-items for these data items similar to those in the access frequency management DB 140. Information on the access frequency factor is set in each data sub-item of the access frequency factor management DB 160. In the embodiment, the access frequency factor is assumed to be expressed as a numerical value of priority rank and indicate that the smaller numerical value is, the more preferentially the measure against the vulnerability is to be performed.

Next, as illustrated in FIG. 6, the weighting determination server 41 calculates the weighting determination value of each container based on the impact factor calculated in s15 and the access frequency factor calculated in s17 for the container (s19). The weighting determination server 41 records information on the weighting determination value of each container in the weighting determination DB 150.

Specifically, first, for each container, the weighting determination server 41 refers to the severity management DB 170 to identify the category of the severity corresponding to each of the impact factors (impact factors related to all vulnerabilities of the container) calculated in s15. Then, the weighting determination server 41 classifies the containers depending on the severity and sets the weighting determination values such that a container with a higher severity has a smaller weighting determination value (higher priority rank).

Then, the weighting determination server 41 refers to the access frequency factor management DB 160 and sets the weighting determination values such that, in each category of severity, a container with a smaller access frequency factor (higher priority rank) has a smaller weighting determination value (higher priority rank).

(Severity Management DB)

FIG. 13 is a diagram illustrating an example of the severity management DB 170. The severity management DB 170 includes data items of severity 171 and score 172. Information on the categories of the severity is set in the severity 171. Information on ranges of the impact factor corresponding to the severity 171 is set in the score 172. Note that, in the present embodiment, one of "urgent", "serious", "alert", "caution", and "none" which are in the descending order of severity (descending order of priority of measures against vulnerability) is assumed to be set in the severity 171.

(Weighting Determination DB)

FIG. 14 is a diagram illustrating an example of the weighting determination DB 150. The weighting determination DB 150 includes data items of application 151, weighting determination value 152, and category 153.

Information identifying each container in each application is set in the application 151. The weighting determination values of the respective containers are set in the weighting determination value 152. Information on the categories of the severity of the respective containers is set in the category 153. In the present embodiment, the weighting determination values of the respective containers are set such that a container in a category with a higher severity has a smaller weighting determination value (higher priority) and, in each category, a container with a larger access frequency factor has a smaller weighting determination value. When there are vulnerabilities in multiple containers, the weighting determination values are reflected as the order of vulnerability resolving processing.

Next, processing performed by the scheduling server is described.

<Process Priority Factor Determining Processing>

Figure 15:
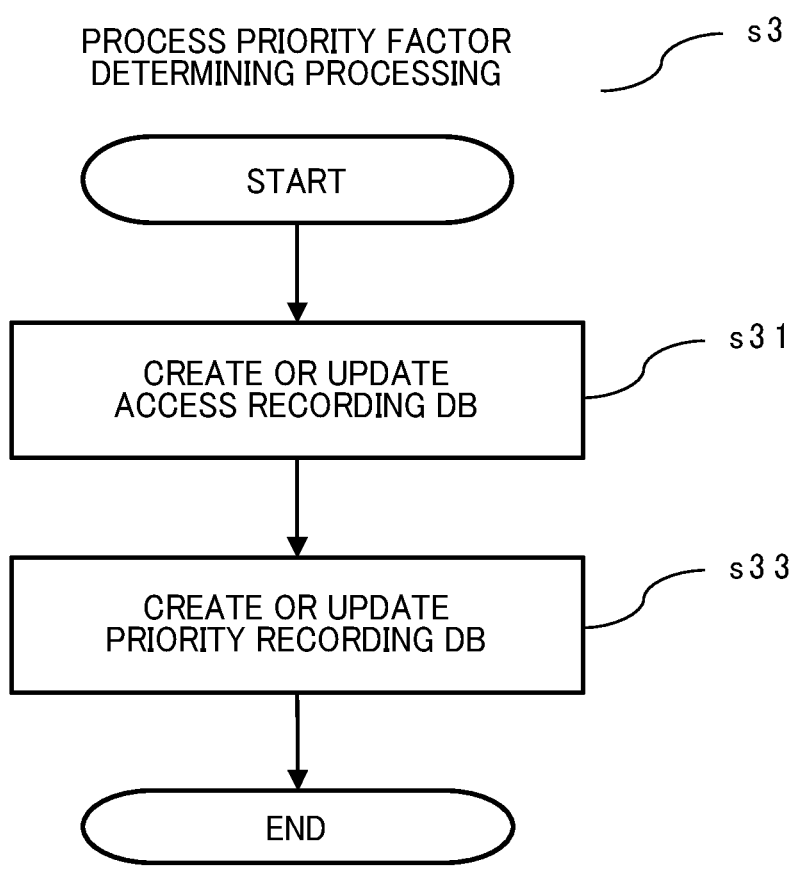
FIG. 15 is a flowchart for explaining an example of process priority factor determining processing.

FIG. 15 is a flowchart for explaining an example of the process priority factor determining processing s3. The process priority factor determining processing s3 is executed at a timing specified by the user or a predetermined timing (for example, predetermined time or predetermined time interval).

The process priority factor determining part 421 of the scheduling server 42 obtains information on the container access numbers stored in the access record management server 23 and creates or updates the access recording DB 200 based on the obtained information (s31).

(Access Recording DB)

FIG. 16 is a diagram illustrating an example of the access recording DB 200. The access recording DB 200 includes one or multiple records having data items of record number 201, process 202, and access number 203.

Numbers assigned to the records are set in the record number 201. Information identifying the processes of the respective containers is set in the process 202. A history of the access numbers related to each of the processes are set in the access number 203. Specifically, the container access numbers in the last predetermined times of recording among the container access numbers recorded at the respective timings by the access record management server 23 are set in the access number 203.

Moreover, as illustrated in FIG. 15, the process priority factor determining part 421 creates or updates the priority recording DB 210 based on the access recording DB 200 created or updated in s31 (s33). The process priority factor determining processing s3 is thus completed.

Specifically, the process priority factor determining part 421 creates or updates the priority recording DB 210 by increasing the process priority factor of a process of a container whose access number is statistically large at the present moment or in the near future and decreasing the process priority factor of a process of a container whose access number is statistically small at the present moment or in the near future.

For example, the process priority factor determining part 421 identifies a process with the largest access number and a process with the smallest access number for each of the last predetermined number of times of access recording recorded in the access record management server 23 to identify a process (hereinafter, referred to as highest frequency process) whose access number has been the largest the most number of times in the last predetermined number of times of access recording and a process (hereinafter, referred to as lowest frequency process) whose access number has been the smallest the most number of times in the last predetermined number of times of access recording. The process priority factor determining part 421 replaces the process priority factor of the highest frequency process identified in the previous same processing with the process priority factor of the highest frequency process identified in the present processing. Moreover, the process priority factor determining part 421 replaces the process priority factor of the lowest frequency process in the previous processing with the process priority factor of the lowest frequency process identified in the present processing.

(Priority Recording DB)

FIG. 17 is a diagram illustrating an example of the priority recording DB 210. The priority recording DB 210 includes data items of record number 211, process 212, and priority factor 213. Information on numbers assigned to records is set in the record number 211. Information identifying each process of each container is set in the process 212. Information on a history of the process priority factor of each process is set in the priority factor 213.

<Scheduling Processing>

Figure 18:
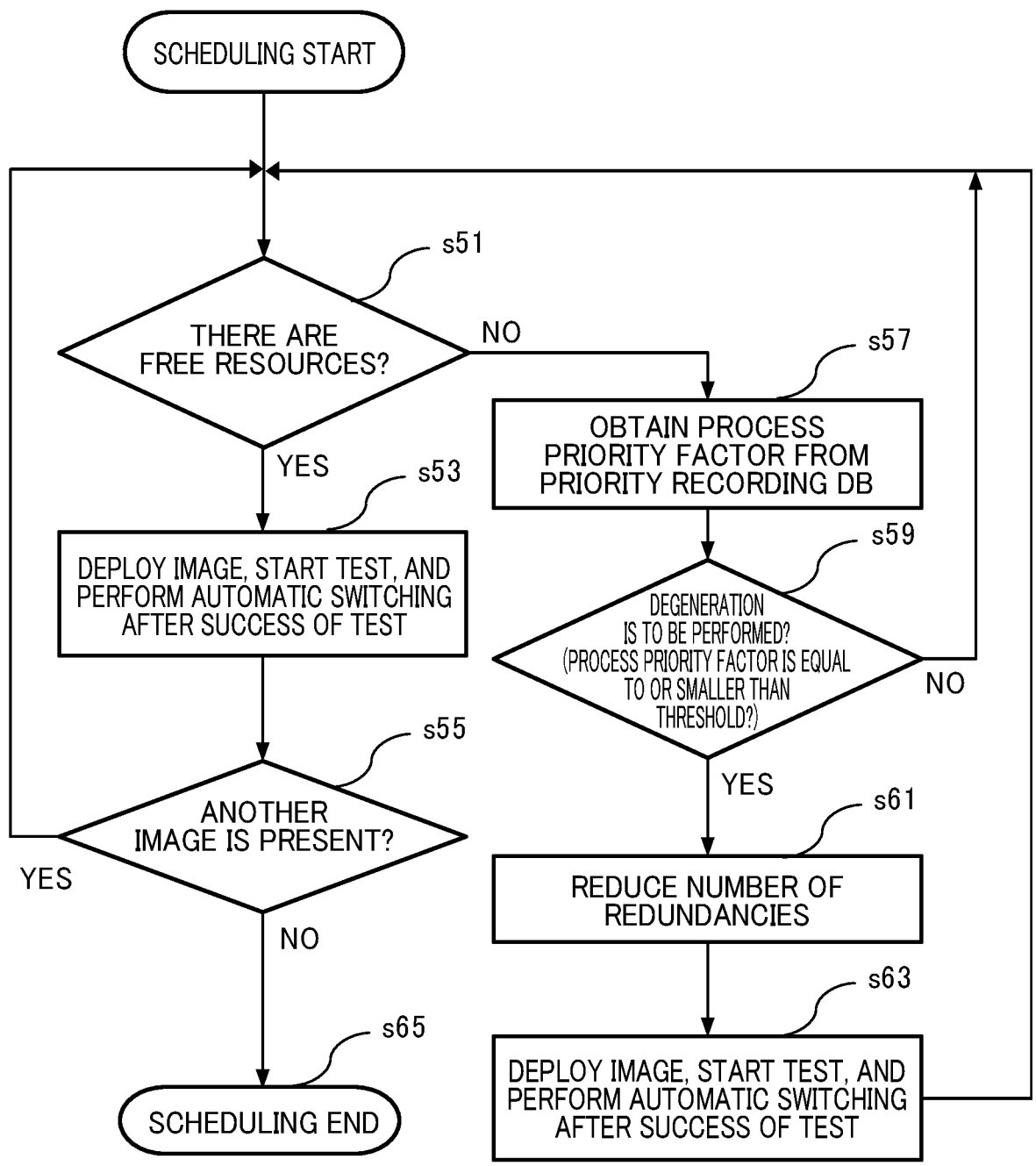
FIG. 18 is a flowchart for explaining an example of scheduling processing.

Next, FIG. 18 is a flowchart for explaining an example of the scheduling processing s5. The scheduling processing s5 is executed, for example, when a vulnerability is detected in one or multiple containers in the application. Note that, in this example, the scheduling server 42 is assumed to have identified the priorities (processing order) of the containers for which vulnerabilities are to be resolved by referring to the weighting determination DB 150 created in the weighting determination value determining processing s1.

The scheduling processing part 422 of the scheduling server 42 determines whether there are currently enough free resources in the application execution platform 10 to perform processing of resolving the vulnerabilities of the containers (application) (s51). For example, the scheduling processing part 422 obtains information on the resources of the application execution platform 10 at the moment and determines whether the resources exceed a predetermined threshold. Note that this threshold may be a constant value or a value that varies depending on various elements such as resources currently operating in the application execution platform 10 or the number of containers with vulnerabilities.

When there are enough free resources (s51: YES), the scheduling processing part 422 executes processing of s53. When there are not enough free resources (s51: NO), the scheduling processing part 422 executes processing of s57.

In s57, the scheduling processing part 422 obtains the process priority factor of each process of each container from the priority recording DB 210.

Then, the scheduling processing part 422 determines whether each process is to be degenerated (the number of redundancies of the process is to be reduced) based on the process priority factor of the process obtained in s57 (s59). Specifically, the scheduling processing part 422 determines whether the process priority factor obtained in s57 is equal to or smaller than a predetermined threshold (for example, 30) for each process.

When there is a process to be degenerated (the number of redundancies of the process is to be reduced) (s59: YES), the scheduling processing part 422 executes processing of s61 for this process. When there is no process to be degenerated (the number of redundancies of the process is not to be reduced) (s59: NO), the scheduling processing part 422 repeats the processing of s51.

In s61, the scheduling processing part 422 reduces the number of redundancies of the process to achieve degeneration. Note that FIG. 19 illustrates an example of an application programming interface (API) command for causing the application execution platform 10 to execute the degeneration. Free resources in the application execution platform 10 are thereby increased. Note that the scheduling processing part 422 may later return the number of redundancies of the degenerated process to the original number when the resolving of the vulnerability is completed.

Then, the scheduling processing part 422 reflects the configuration of the container for which the process is degenerated, in the application execution platform 10 (s63). For example, the CD server 30 executes processing of deploying the container to the application execution platform 10, processing of executing a verification of the application related to the deployed container, and processing of switching the original application to the application for which the verification is successfully executed, based on instructions from the scheduling processing part 422. Procedures of the processing of container deploying, the processing of verification execution, and the processing of switching are described in processing of s53 to be described next. Thereafter, the processing of s51 is repeated.

Meanwhile, in s53, the scheduling processing part 422 executes the processing of deploying, the processing of verification execution, and the processing of switching for the container of the application that has vulnerability as described below.

Specifically, first, the scheduling processing part 422 obtains contents (handling method) of update processing for resolving the vulnerability of the container of the application, from the vulnerability information management DB 100.

Then, the scheduling processing part 422 instructs the CI server 52 to obtain resources necessary for achieving the obtained handling method. The CI server 52 obtains the resources from the source code library management server 51 and builds (creates) an image of the container based on the obtained resources. Note that this processing may be executed in advance before the execution of the scheduling processing s5 (for example, when the vulnerability is detected).

The CD server 30 deploys the built image of the container to the application execution platform 10. For example, the CD server 30 temporarily moves an application (for example, Pod) operating on an OS to be updated to another OS and then executes update of the OS. Update can be thereby executed without stopping services of the application execution platform 10.

After completion of this deploying, the CD server 30 executes a verification of each application on the application execution platform 10 for a predetermined time. After the execution of the verification, when the CD server 30 determines that the verification is successfully executed, the CD server 30 switches an image of a currently-present container to the image of the container deployed to the application execution platform 10.

Then, the scheduling processing part 422 determines whether there is an image of a container for which a vulnerability is to be resolved next (container with the next highest priority rank) (s55). Next, when there is an image of a container for which a vulnerability is to be resolved next (s55: YES), the scheduling processing part 422 repeats the processing of s51. When there is no image of a container for which a vulnerability is to be resolved next (s55: NO), the scheduling processing s5 is terminated (s65).

Figure 20:
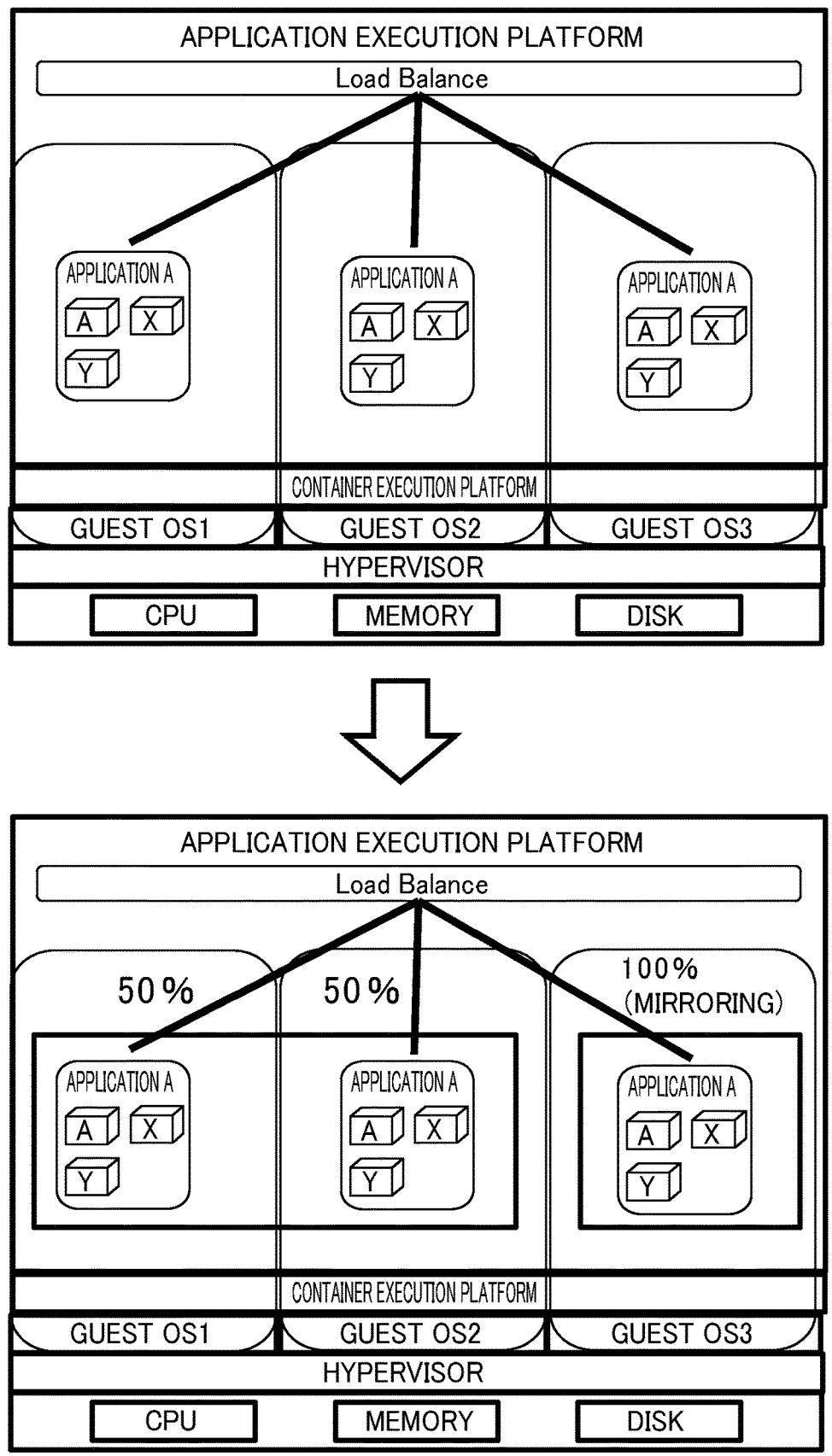
FIG. 20 is a diagram illustrating an example of DCR.

Although methods of updating, deploying, and releasing the containers 11 of the application execution platform 10 are not limited to particular methods, the CD server 30 is assumed to execute the verification and the deploying based on dark canary release (DCR) and progressive delivery (PD) in the present embodiment. DCR is a method of performing update and release only for predetermined developers. This allows release to be performed surely and safely without an impact on the application execution platform 10. PD is a deploying method in which, as a step subsequent to the continuous delivery (CD), predetermined analysis (analysis such as verification of accuracy rate and performance) is performed and automatic rollback is performed depending on a result of the predetermined analysis (result of the verification performed by some users) before release to all users. FIG. 20 illustrates an example of DCR. Note that the methods of updating and releasing may be other methods such as, for example, A/B test or canary release (CR).

As described above, the vulnerability management system 40 of the present embodiment calculates the impact factor that indicates the magnitude of the impact of the vulnerability of each container 11 in the application execution platform 10 on the application execution platform 10, based on the vulnerability information, calculates the access frequency factor based on the access frequency information of each container, calculates the weighting determination value that indicates the priority of the measure against the vulnerability of each container based on the impact factor and the access frequency factor, determines the order of measures for the respective multiple containers based on the weighting determination values calculated for the respective multiple containers, and executes the measures for the respective multiple containers according to the determined order.

Specifically, the vulnerability management system 40 of the present embodiment determines the priorities of resolving the vulnerabilities of the respective containers (application) from the viewpoint of the impact on the system and the priorities of the processes (weighting determination values) and resolves the vulnerabilities of the respective containers according to the order determined by using the weighting determination values.

As described above, when there are multiple vulnerabilities in the application execution system, the vulnerability management system 40 according to the present embodiment can efficiently resolve these vulnerabilities.

Moreover, the vulnerability management system 40 of the present embodiment calculates the process priority of each container based on the data access frequency of the container and, when the calculated process priority is equal to or smaller than the predetermined threshold, degenerates a process of the container related to this process priority and then executes the measures for the respective containers according to the order determined as described above by using the weighting determination values.

Increasing free resources of the application execution platform 10 by degenerating a process with a low priority (reducing the number of redundancies) as described above enables the processing of resolving the vulnerabilities of the respective containers to be performed quickly.

Moreover, the vulnerability management system 40 of the present embodiment calculates the access frequency factor by setting the priority ranks for data transmission and data reception of the container (priority ranks for the inbound communication and the outbound communication) and by setting the priority ranks according to whether the range in which the container transmits or receives data is in the same application (local communication), another application in the application execution platform 10 (in-cluster communication), or another application execution system (out-of-company communication).

Calculating the access frequency factor based on the form of communication in the application execution platform 10 and the application allows the priority ranks of the measures against vulnerabilities to be determined according to magnitudes of risks of data communication.

The present invention is not limited to the aforementioned embodiment and can be carried out by using any component within a scope not departing from the gist of the present invention. The embodiment and modified examples described above are merely examples and the present invention is not limited to the contents of these embodiment and modified examples as long as the features of the invention are not impaired. Moreover, although various embodiment and modified examples are described above, the present embodiment is not limited to the contents of these embodiment and modified examples. Other modes conceivable within the scope of the technical idea of the present invention are also included in the scope of the present invention.

Moreover, some of functions included in each apparatus in the present embodiment may be provided in another apparatus and functions included in separate apparatuses may be provided in the same apparatus.

Moreover, the formulae for calculating the impact factor and the access frequency factor described in the present embodiment are examples, and any formula or parameter may be added or modified. Furthermore, the evaluation value of vulnerability may be an evaluation value other than the CVSS score.

What is claimed is:

1. A vulnerability management system including a processor and a memory, comprising:
   an impact factor calculation part configured to calculate an impact factor based on vulnerability information, the impact factor being a parameter indicating a magnitude of an impact of a vulnerability of a container in an application execution system, in which an application is executed by one or a plurality of containers, on the application execution system, the vulnerability information being information in which the vulnerability and an evaluation value of the vulnerability are associated with each other;
   an access frequency factor calculation part configured to calculate an access frequency factor based on access frequency information, the access frequency factor being an evaluation value of a vulnerability deriving from a form of communication performed by the container, the access frequency information being information indicating a transmission or reception range and a transmission or reception frequency of data transmitted or received by the container obtained by monitoring contents of transmission and reception of data transmitted and received by the container;
   a weighting determination value calculation part configured to calculate a weighting determination value based on the calculated impact factor and the calculated access frequency factor, the weighting determination value indicating priorities of measures against the vulnerability of the container, the measures being security updates of the container to resolve the vulnerability; and
   a scheduling processing part configured to determine the order of the measures, respectively, for a plurality of the containers based on the weighting determination values calculated for the plurality of containers and execute the measures, respectively, for the plurality of containers according to the determined order, and execute the measures, being the security updates, respectively, for the plurality of containers according to the determined order of measures.

2. The vulnerability management system according to claim 1, wherein the scheduling processing part
   calculates a priority of processing executed by each of the plurality of containers based on a data access frequency of the container,
   determines whether the calculated priority of the processing is equal to or smaller than a predetermined threshold,
   when determining that the calculated priority of the processing is equal to or smaller than the predetermined threshold, degenerates a process of the container related to the priority of the processing determined to be equal to or smaller than the predetermined threshold, and
   executes the measures, after the degeneration.

3. The vulnerability management system according to claim 1, wherein the access frequency factor calculation part calculates the access frequency factor by setting priority ranks for data transmission and data reception of the container and by setting priority ranks according to whether a range in which the container transmits or receives data is in the same application, another application, or another application execution system.

4. A vulnerability management method implemented by an information processing apparatus, the method comprising:

impact factor calculation processing of calculating an impact factor based on vulnerability information, the impact factor being a parameter indicating a magnitude of an impact of a vulnerability of a container in an application execution system, in which an application is executed by one or a plurality of containers, on the application execution system, the vulnerability information being information in which the vulnerability and an evaluation value of the vulnerability are associated with each other;

access frequency factor calculation processing of calculating an access frequency factor based on access frequency information, the access frequency factor being an evaluation value of a vulnerability deriving from a form of communication performed by the container, the access frequency information being information indicating a transmission or reception range and a transmission or reception frequency of data transmitted or received by the container obtained by monitoring contents of transmission and reception of data transmitted and received by the container;

weighting determination value calculation processing of calculating a weighting determination value based on the calculated impact factor and the calculated access frequency factor, the weighting determination value indicating a priorities of measures against the vulnerability of the container the measures being security updates of the container to resolve the vulnerability; and a scheduling processing of determining the order of the measures, respectively, for a plurality of the containers based on the weighting determination values calculated for the plurality of containers and executing the measures, respectively, for the plurality of containers according to the determined order, and execute the measures, being the security updates, respectively, for the plurality of containers according to the determined order of measures.

5. The vulnerability management method according to claim 4, wherein, in the scheduling processing, the information processing apparatus calculates a priority of processing executed by each of the plurality of containers based on a data access frequency of the container, determines whether the calculated priority of the processing is equal to or smaller than a predetermined threshold, when determining that the calculated priority of the processing is equal to or smaller than the predetermined threshold, degenerates a process of the container related to the priority of the processing determined to be equal to or smaller than the predetermined threshold, and executes the measures after the degeneration.

6. The vulnerability management method according to claim 4, wherein, in the access frequency factor calculation processing, the information processing apparatus calculates the access frequency factor by setting priority ranks for data transmission and data reception of the container and by setting priority ranks according to whether a range in which the container transmits or receives data is in the same application, another application, or another application execution system.

\* \* \* \* \*